C. M. PROPST.
CONTAINER FOR CHALK LINES.
APPLICATION FILED APR. 3, 1916.
1,324,171.
Patented Dec. 9, 1919.
Fig. 1.
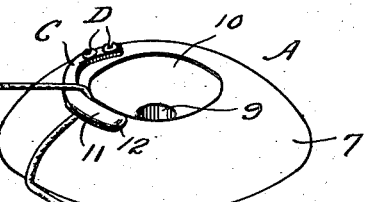
Fig. 2.
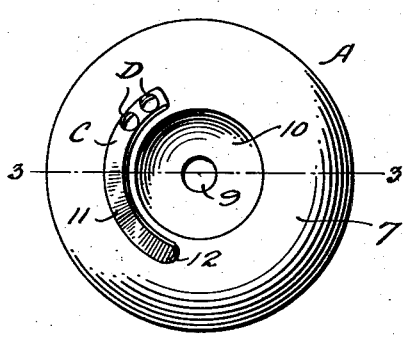
Fig. 3.
Fig. 4.
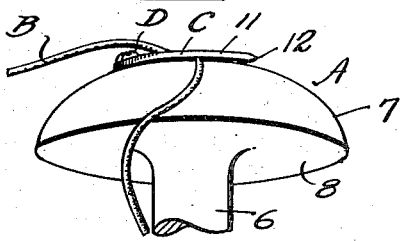
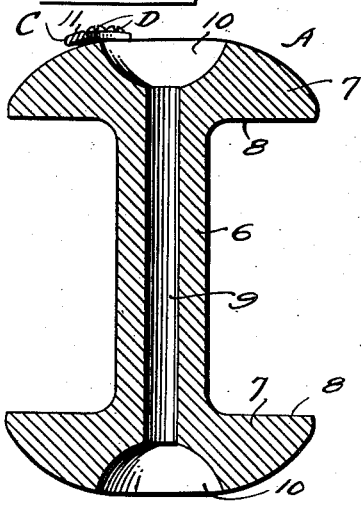
Fig. 5.
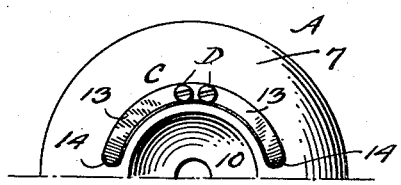
Inventor
Charles M. Propst.
By
Lancaster and Allwine
His Attorneys

UNITED STATES PATENT OFFICE.

CHARLES M. PROPST, OF MARSHALLTOWN, IOWA, ASSIGNOR OF ONE-HALF TO FRANK G. PIERCE, OF MARSHALLTOWN, IOWA.

CONTAINER FOR CHALK-LINES.

1,324,171.     Specification of Letters Patent.     Patented Dec. 9, 1919.

Application filed April 3, 1916. Serial No. 88,654.

*To all whom it may concern:*

Be it known that I, CHARLES M. PROPST, a citizen of the United States, and a resident of Marshalltown, in the county of Marshall and State of Iowa, have invented a new and useful Improvement in Containers for Chalk-Lines, of which the following is a specification.

My present invention relates to containers, embodying a spool and a retainer for chalk lines, such as are used by carpenters and other mechanics in laying out true lines.

The principal object of my invention is to provide a spool of the character described embodying a retainer or friction clutch for the line or cord, so shaped and positioned that it will not interfere with easy handling or manipulation of the spool in playing out or winding in the line upon the main body portion of the spool.

It is now common practice among mechanics to accumulate a number of feet of the chalk line upon the spool and secure the outer end portion, when not in use, by tying a loop at such portion and placing the loop over one end portion of the spool. Also, as a portion of the line is played out, or unwound, for use, the remaining portion about the spool is kept from unwinding by the tying of another loop in the line, intermediate its end portions, and passing such loop over the head of the spool. As a result when the mechanic is through with the line for the time being, he winds the extending portion of the cord about the spool, without first removing the second-mentioned loop, and when the line is again brought into use, say for making a line of greater length than that for which the line was previously used, the operator must first remove the end loop from about the spool, play out the line until the second loop is reached, remove it from engagement with the spool, untying such second loop, play out more line, and then form another loop after the desired amount has been played out, and place said last-mentioned loop about the spool to prevent the remaining portion of the line from unwinding. All of this takes time, and often results in a number of mechanics remaining idle while the line is being made ready for use. Furthermore, if the loops are removed from the end portion of the spool other than that end portion over which it was first placed, the line becomes knotted which is very objectionable. Therefore, another object of my invention is to provide a simple and efficient device which will enable the mechanic to retain the end portion detachably secured to the spool, without the tying of the loop, and also to similarly secure any portion of the line intermediate its ends to the spool, after the desired amount of the line has been played out. I am aware of the fact that cord and thread retainers have been brought into use, and that such have been patented, but my invention is particularly adapted for chalk lines, and the retainer is so shaped and positioned with respect to the spool as to not interfere with the unwinding action when the spool is grasped at ends by the thumb and one of the fingers of the hand, and also to retain the line intermediate its ends against accidental or casual displacement, enabling the mechanic to quickly make ready the desired line and in all, facilitate the operation.

Other objects of the invention will appear in the following detailed description, taken in connection with the accompanying drawing, forming a part of this specification, and in which drawing:

Figure 1 is a perspective view of a container constructed according to my invention, showing a portion of the line extending therefrom.

Fig. 2 is an end elevation of said container, the line having been removed.

Fig. 3 is a central longitudinal section through said container, on the line 3—3 of Fig. 2.

Fig. 4 is a fragmentary perspective view of one end portion of the container, a portion of the line being shown in operative relation thereto.

Fig. 5 is a fragmentary end elevation, similar to Fig. 2, but showing the modification of my invention.

In the drawings where similar characters refer to similar parts throughout the views, A designates generally the spool; B a chalk line carried thereby; C a retainer for the chalk line; and, D means for securing the retainer C to the spool A.

Referring first to the spool A, it comprises a main body portion 6 and ends 7, the latter being preferably of relatively flat conoidal shape, with their bases 8 innermost. If desired, a bore 9 may extend through the ends 7 and body portion 6 concentric to their common axis. I also prefer to provide a cup-like recess 10 in each end 7 concentric to the axis of the spool A which may receive the end portions of the thumb and a finger of the operator's hand, facilitating the unwinding of the line B from the spool. That is, the operator may grasp the spool by placing the end portions of his thumb and one finger in the recesses 10, where they serve like trunnions about which the spool may rotate.

As to the retainer C it is made of resilient material, such as spring steel, and is arcuate in shape, as clearly shown in the drawing. In addition to being arcuate, it is curved longitudinally, so as to conform with the curvature of the end 7 to which it is secured. In the example shown, it is also positioned to lie in parallelism to the edge of the cup-like recess 10, but spaced slightly therefrom, so that, as the spool rotates, it will not interfere with the operator's hand for if it does engage either the thumb or finger there will be no tendency to throw the spool laterally but the retainer will ride uniformly, throughout its length, against the finger or thumb. Furthermore, when the chalk line is engaged beneath the resilient retainer it must first pass over the edge of the ends 7 which carries the retainer, thus forming a second brake for the line when in connection with the brake afforded by the retainer to prevent the coils of the chalk line from loosening upon the spools during rotation or movement of the spools after the chalk line is secured in place.

The securing means D may comprise a plurality of screws or any other suitable devices, and is positioned so that the retainer includes a free end portion 11, between which, and the face of the end to which the retainer is secured, the cord or line B may be frictionally secured, as clearly shown in Figs. 1 and 4 of the drawing. The free end portion 11 is tapered to a rounded edge 12 so that, as the cord or line is drawn over the face of the head to which the retainer is secured, it will ride between the said face and the retainer, and this tapered portion also serves to prevent it from interfering with the manipulation of the spool in the unwinding action.

In Fig. 5 I have shown a modification, where the retainer C is provided with two free end portions 13, each having the rounded edge 14 toward which the body of the retainer tapers. In connection with a container embodying a retainer of this character, the line or cord may be placed under either, or both free end portions 13.

When bringing the container into use, the line B is played therefrom until the desired amount is ready for use. The line adjacent the spool is then drawn over the face of end 7, on which the retainer C is secured, the line finding its way between said retainer and said face of the head. If the spool is positioned with respect to the free end portion of the line, as shown in Fig. 1, there is no danger of the line becoming loose in use, since it engages the shorter longitudinal edge of the arcuate retainer.

From the foregoing it is made manifest that I have provided a container for chalk lines where it will not be necessary to tie loops in the line in order to secure either the end portion or any portion intermediate the ends to the spool.

Changes in details may be made without departing from the spirit or scope of my invention; but,

I claim:

A container for chalk lines comprising in combination, a spool including a main body portion and enlarged ends of relatively flat conoidal shape with their bases innermost, a resilient retainer curved longitudinally and transversely to conform to the convex surfaces of said ends secured against the convexed surface of one end of the body concentrically and inwardly of the marginal edge of the end and having a free end portion adapted to frictionally receive therebeneath a chalk line when passed over the edge and convexed surface of said end whereby a dual brake for the chalk line will be provided at the container.

CHARLES M. PROPST.